(12) United States Patent
Bou-Abboud

(10) Patent No.: US 10,108,905 B2
(45) Date of Patent: *Oct. 23, 2018

(54) IMPROVING AN ELECTRONIC SYSTEM BASED ON CAPACITY DEMANDS OF A NETWORK DEVICE

(71) Applicant: Comcast Cable Communications, LLC, Philadelphia, PA (US)

(72) Inventor: Claude H. Bou-Abboud, Townsend, DE (US)

(73) Assignee: Comcast Cable Communications, LLC, Philadelphia, PA (US)

(*) Notice: Subject to any disclaimer, the term of this patent is extended or adjusted under 35 U.S.C. 154(b) by 791 days.

This patent is subject to a terminal disclaimer.

(21) Appl. No.: 14/194,014

(22) Filed: Feb. 28, 2014

(65) Prior Publication Data

US 2015/0248610 A1 Sep. 3, 2015
US 2016/0358079 A9 Dec. 8, 2016

Related U.S. Application Data

(63) Continuation of application No. 11/374,507, filed on Mar. 13, 2006, now Pat. No. 8,705,359.

(51) Int. Cl.
G06Q 10/00 (2012.01)
G06N 5/04 (2006.01)
H04L 12/26 (2006.01)
H04L 12/24 (2006.01)

(52) U.S. Cl.
CPC ............ G06N 5/04 (2013.01); H04L 41/147 (2013.01); H04L 43/0876 (2013.01)

(58) Field of Classification Search
CPC ............................. G06Q 10/00; G06Q 30/02
USPC .............................................. 705/7.11–7.42
See application file for complete search history.

(56) References Cited

U.S. PATENT DOCUMENTS

| | | |
|---|---|---|
| 2002/0172222 A1 | 11/2002 | Ullmann et al. |
| 2005/0005012 A1 | 1/2005 | Odhner et al. |
| 2005/0071019 A1* | 3/2005 | Liao ................. H04L 12/24 700/28 |
| 2005/0108380 A1 | 5/2005 | Odhner et al. |
| 2005/0120111 A1 | 6/2005 | Bailey et al. |
| 2005/0132051 A1 | 6/2005 | Hill et al. |
| 2005/0234920 A1* | 10/2005 | Rhodes ............... G06F 21/552 |
| 2006/0120282 A1 | 6/2006 | Carlson et al. |
| 2006/0200546 A9 | 9/2006 | Bailey et al. |
| 2007/0094381 A1 | 4/2007 | Weiss et al. |
| 2007/0136772 A1 | 6/2007 | Weaver et al. |

(Continued)

FOREIGN PATENT DOCUMENTS

WO 2005060161 A1 6/2005

OTHER PUBLICATIONS

Response to Canadian Office Action—CA 2,581,561—dated Mar. 25, 2015.

*Primary Examiner* — Robert D Rines
(74) *Attorney, Agent, or Firm* — Banner & Witcoff, Ltd.

(57) ABSTRACT

Method of predicting capacity demands on a desired device used to support services for a number of subscribers within a market area having a number of devices. The method includes predicting the capacity demands as a function of historical capacity demands for the desired device and average subscriber capacity demands on the number of devices in the market area.

14 Claims, 2 Drawing Sheets

(56) References Cited

U.S. PATENT DOCUMENTS

2008/0016213 A1 1/2008 Akinaga et al.
2008/0192820 A1* 8/2008 Brooks .............. H04N 7/17318
375/240.02

* cited by examiner

IMPROVING AN ELECTRONIC SYSTEM BASED ON CAPACITY DEMANDS OF A NETWORK DEVICE

CROSS REFERENCE TO RELATED APPLICATIONS

The present application is a continuation of and claims priority to U.S. patent application Ser. No. 11/374,507, filed Mar. 13, 2006, entitled TOOL FOR PREDICTING CAPACITY DEMANDS ON AN ELECTRONIC SYSTEM.

BACKGROUND OF THE INVENTION

1. Field of the Invention

The present invention relates to tools and other automated features having capabilities for predicting capacity demands on an electronic system.

2. Background Art

The ability to predict capacity demands on an electronic system may be important to insure adequate resources are available for supporting future customer demands. In cable systems for example, a cable system operator may be required to support a plurality of services for any number of customers. As the number of customers and the overall demands of the system increases, more and more resources may be required to meet service requirements.

One problem faced by the cable system operators relates to accurately predicting future demands on the system. Inaccurate predictions can lead to over estimations and result in unnecessary hardware costs or under estimations and result in system inoperability and customer dissatisfaction. One issue in accurately predicting future demands on the system relates to the cable system operator's ability to adjust the predictions as a function of individual customer usage.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
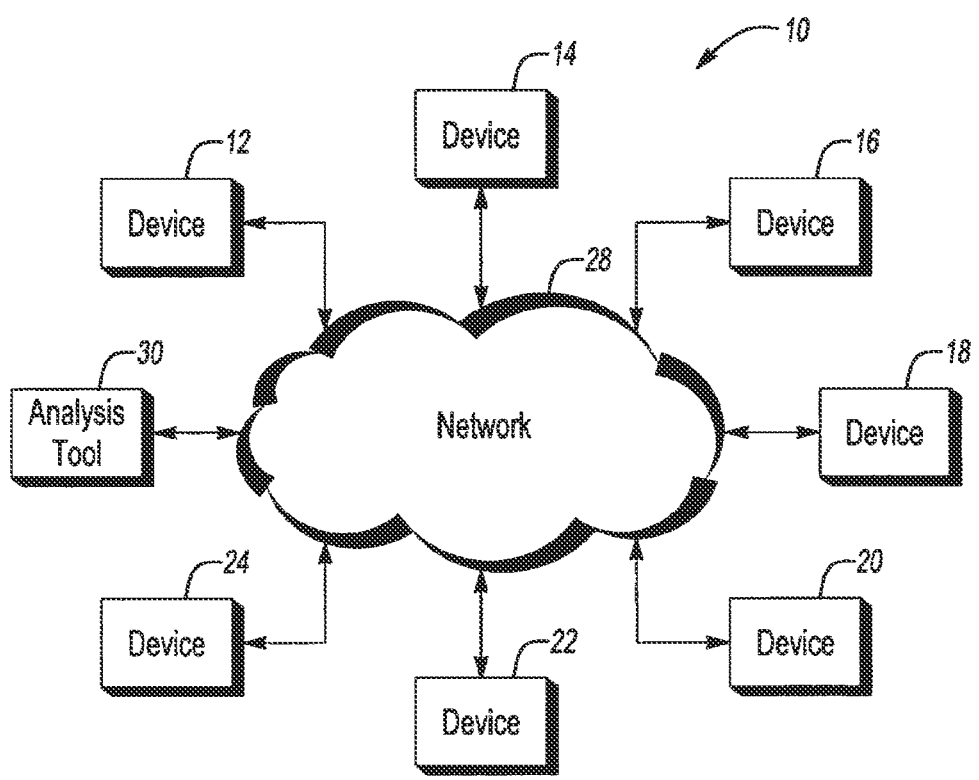
FIG. 1 illustrates a system in accordance with one non-limiting aspect of the present invention.

FIG. 1 illustrates a system 10 in accordance with one non-limiting aspect of the present invention. The system 10 may relate to any number of environments where signals are transmitted between a plurality of electronic devices 12-24. For exemplary purposes, the present invention is described with respect to the system 10 being configured to support signal communications associated with cable operations. Of course, the present invention is not intended to be so limited and contemplates its application in any number of environments.

With respect to the exemplary cable environment, one or more of the devices 12-24 may include or be associated with a system (headend) or other feature of a cable service provider to facilitate signal communications between other devices. It may include a memory (not shown), user interface (not shown), and other features to control, program, and execute the operation thereof. The devices 12-24 may include or be associated with any number of electronic devices which receive, communicate, or perform other signal manipulations.

For example, a portion of the devices 12-24 may include or be associated with signal transmission such as, but not limited to, routers, hubs, switches, gateways, conditional access routers (CARs), cable modem terminations systems (CMTSs), network provisioning units (NPUs), a session boarder controller, a media gateway, a media gateway controller, a signaling gateway, a call management server, a presence server, a SIP routing proxy, a SIP proxy/registrar server, a PCMM policy server, a bandwidth on demand server, a streaming server caching proxy, a gaming server, a CDN, a media acquisition server, a provider server, a unified messaging server, a SIP feature server, a OSS/BSS, and a global directory server.

The devices 12-24 may also include or be associated with customer premise equipment configured to receive, output, and otherwise manipulate cable related signals for use by one or more customers. For example, a portion of the devices may include or be associated with settop boxes (STBs), modems, cable modems (CMs), computers, digital or personal video recorders (DVRs, PVRs) media terminal adapters (MTAs), and/or outlet digital adapters (ODAs).

A network 28 may include any number of features and options to support signal communications between the devices 12-24. The network 28 may include terrestrial and extraterrestrial components and infrastructures. It may include cable lines, telephone lines, and/or satellite or other wireless architectures. The network may be associated with other private and/or public networks, such as the Internet and provider specific private networks. The network 28 is shown as a feature separate from the devices 12-24, however, this is merely done for exemplarily purposes. One or more of the devices 12-24 may be configured to support or provide other features associated with the network 28.

In an embodiment of the present invention, the system 10 includes an analysis tool 30 for analyzing system capabilities and capacities. The analysis tool 30 may be a standalone feature having memories, processors, communications features, and the like to facilitate analyzing operation of one or more of the devices 12-24 in the system 10. The analysis tool 30 may similarly be a logical application, software program, or other functional feature, which may optionally be embedded on a computer-readable medium or similar feature for execution by one or more of the devices.

In an embodiment of the present invention, the analysis tool 30 communicates with one or more of the devices 12-24 to analyze and monitor the operations thereof. It may communicate according to any number of protocols and standards in order to analyze any number of parameters associated with the devices 12-24, such as capacity of the devices 12-24 to support electronic data services for a number of customers, current and future customer demands, independent and shared processing operations, data storage, and any number of other parameters associated with the operation thereof.

In an embodiment of the present invention, the devices 12-24, tool 30, and network 28 are configured to operate according to or support the operation of any number of protocols, applications, and procedures, including applications such as, but not limited to, linear and non-linear television programming (cable, satellite, broadcast, etc.), Video on Demand (VOD), interactive television (iTV), interactive gaming, pay-per-view (PPV), and protocols such as Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and others.

Figure 2:
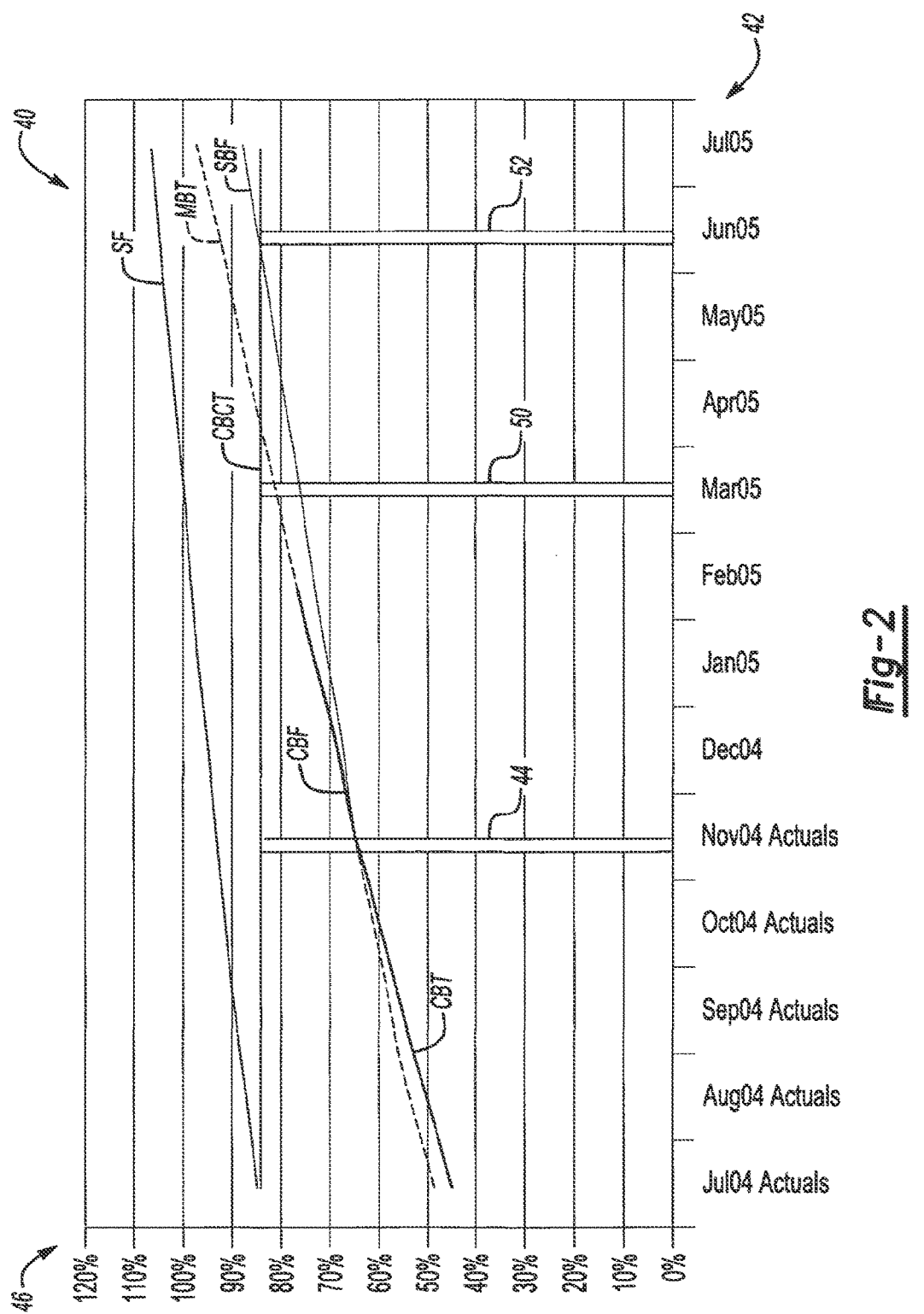
FIG. 2 illustrates a capacity prediction chart in accordance with one non-limiting aspect of the present invention.

FIG. 2 illustrates an example of a capacity prediction chart 40 generated and outputted by the analysis tool 30 as a function of information collected from the devices 12-24 and other inputs provided by an operator. The chart 40 may be used by a system operator or other individual associated with monitoring operation of the system 10 and/or one or more devices within the system 10. The capacity prediction chart 40 may include features, as described below in more detail, for comparing system capabilities against predicted demands.

The capacity prediction chart 40 illustrates bandwidth demands and capacity requirements of a particular electronic circuit within a particular geographic area or market used to support network communications in which a service provider provides high speed data applications. An electronic circuit may be a fiber optic line or a switch coupled to a fiber optic line. A local/regional otherwise organized communications network may include a number of wireless or wireline electronic circuits within a particular geographical area to support data transmissions for a number of subscribers. The data services may be freely transferred between various circuits within the communications network.

The capacity prediction chart 40 may be used by the system operator to predict capacity demands on the particular circuit being analyzed and to determine whether action is needed to continue quality service. In this manner, the chart may be used to determine whether future demand is likely to outpace capacity, and if so, to facilitate augmenting the circuit to support the predicted demand and/or to direct migration of the subscribers to other circuits in area.

The horizontal axis 42 of the chart relates to a particular interval of time, which is shown to correspond with monthly calendar increments. As shown, the horizontal axis includes an historical period associated with periods before a base date 44 for which network data is available and a predicted portion associated with periods after the base date. For the purposes of this example, the base date is selected to be November of 2004. The base date may be selected as any date for which historical data is available. The historical period may be any period for which the historical data is available. In this example, the historical period is five months, however, the period may be longer or shorter. Typically, the base date is selected to correspond with the date at the time of performing the analysis.

The vertical axis 46 of the chart is capacity for the circuit. The values are based on capacity percentages determined as a function of circuit bandwidth thresholds. The chart 40 includes a first plotted element referred to as circuit bandwidth trend, CBT. The CBT reflects actual usage of the circuit during the historical period. The CBT is based on data points of actual subscriber bandwidth use as a percentage of a predefined bandwidth of the circuit under analysis. For example in July, 2004, the subscriber bandwidth use was 44% and in August, 2004, the subscriber bandwidth use was 50%. These subscriber bandwidth use data points are used to develop a linear plot based on the linear equation y=mx+b, where x is the slope of the line and b is the y-intercept. In this example, the CBT plot is based on the linear equation y=0.05x+0.404.

The chart 40 also includes a second plotted element referred to as market bandwidth trend, MBT. The MBT reflects both actual (historical) bandwidth consumption, on a per subscriber basis, for a particular predefined market associated with the circuit during the historical period and forecasted bandwidth consumption, on a per subscriber basis, for the market. The analyzed circuit may be one of a number of circuits within the particular market such that the MBT reflects the average bandwidth consumption of each subscriber within the particular market, i.e., the average subscriber capacity demand of multiple subscribers across all the circuits in a given market. The historical MBT is based on data points of all of the actual subscriber bandwidth use in the market as a percentage of a predefined bandwidth of all of the circuits in the market. For example in July, 2004, the subscriber bandwidth use for the market was 44% and in August, 2004, the subscriber bandwidth use for the market was 50%. These subscriber bandwidth use data points are used to develop a linear plot, as described above, for the mar. In this example, the MBT plot is based on the linear equation y=0.0408x+0.450. The forecasted MBT is determined by extending the linear plot forward from the base date. The MBT may be determined by the tool 30 as a function of values inputted thereto or values collected from monitoring or other operations associated with the selected market area.

When the slope $m_{CBT}$ of the CBT is positive and greater or negative but still greater than the slope $m_{MBT}$ of the MBT, it indicates that the circuit is unusually loaded. This can occur with circuits supporting colleges or universities where usage tends to be higher than in the rest of the market. This suggests that this circuit is a candidate for action. When the slope $m_{CBT}$ of the CBT is positive and less than or negative and less than the slope $m_{MBT}$ of the MBT, it indicates that the circuit is under utilized and a potential candidate for supporting subscribers migrated from more active circuits, such as the aforementioned college or university circuits.

A circuit bandwidth capacity threshold, CBCT is selected and a corresponding line is included in the chart 40. The CBCT is a desired capacity threshold for the circuit at, which point, when exceeded indicates that the circuit will be operating at greater than optimum capacity and less than optimum service and should be upgraded. In this example the circuit has a CBCT of 85%. The CBCT may be determined according to any number of design and quality of service characteristics.

The CBCT extends the entirety of the horizontal axis and is used to predict when the capacity demands on the circuit will exceed the selected threshold and warrant action to the circuit. As one skilled in the art will appreciate, most actions, whether it includes migrating some of the subscribers/bandwidth demands to other circuits, adding additional infrastructures to support greater volumes of data, or some other action, requires some planning and foresight such that it can be advantageous for system operators to plan in advance for the action.

To this end, the analysis tool 30 generates a circuit-based bandwidth capacity forecast, CBF to predict bandwidth capacity demands for the circuit as a function of average subscriber usage in the market area. The CBF is determined by the tool as a function of the CBT and MBT. For example, the CBF may be determined according to the following equation:

$$M_{CBF} = (m_{CBT} + m_{MBT})/2$$

where $m_{CBF}$ is the slope of the CBF, $m_{CBT}$ is the slope of the CBT, and $m_{MBT}$ is the slope of the MBT.

The linear plot for the CBF is developed from the equation $y=m_p x+b$, wherein b is the vertical axis value at the end of the CBT linear plot. The linear plot for the CBF extends from the CBT. The CBF is a function of both the CBT and MBT. This allows the CBF to take into consideration the average subscriber usage for the market area. The use of the CBF is advantageous because it allows the system operator to determine capacity requirements as a function of average usage across the entire market, and not only the analyzed circuit.

This allows the system operator to take advantage of other system capacities in the market when determining action. For example, if the slope of the MBT is less than the slope of the CBT, the slope of the CBF will be less than the slope of the CBT, and thereby, extend the date by which the CBCT will be reached. This analysis will suggest that the date for action on the circuits can be put off by migrating subscribers from the circuit under analysis to other circuits in the market. On the other hand, if the slope of MBT is greater than the slope of CBT, the analysis will suggest that the circuit under analysis should be able to take some subscribers from other circuits in the market that may be overburdened. This is done to take advantage of other bandwidth available in the system by simply migrating the subscribers to other available circuits, which can be done with minimal costs and interruptions and without the expense of augmenting the circuit.

As shown in the example of FIG. 2, the CBF extends forward from the CBT only for a three month period, but it may extend for a greater period of time. The three month period is selected to limit introduction of inaccuracies and/or to reflect the need to only plan three months in advance for corrective action. In this particular example, the CBF does not reach the CBCT. As such, there is no indication that the circuit will have to be changed (in the next three months). However, if the CBF is visually extended farther in time it will cross the CBCT at some point around March 2005. Accordingly, based on this information, the system operator may determine a need to plan for action sometime before threshold is reached.

Optionally, the tool 30 may be configured to automatically calculate when the predictive trend P will cross the CBCT and the time period associated therewith. This may be done by the tool 30 calculating in calendar days the period between the base date and the date the CBF crosses the CBCT. The time period (not shown) may be noted on the chart 40 or otherwise communicated to the system operator, such as through an automatically generated email message or other alert.

A planned circuit upgrade bar 50 may be included to assist the system operator in determining the corrective action. The circuit upgrade bar 50 may reference information associated with planned corrective action(s), circuit augmentation, subscriber migration, or other similarly planned events. The operator may review the planned event to determine whether it is sufficient to meet current demand predictions and/or to determine whether additional requirements may be added to it to support current predictions.

The tool 30 may be configured to automatically calculate a time period between the base date 44 and the circuit upgrade date 50 and to compare this time period against the time period calculated above with respect to the CBF surpassing the CBCT. The tool 30 may generate a message or other alert to inform the system of operator whether the planned circuit upgrade is scheduled to occur before or after the CBF reaches the CBCT, which the system operator may use to assist in determining the appropriate action.

The chart 40 also includes a third plotted element referred to as subscriber forecast, SF. The SF reflects both actual (historical) subscribers using the circuit under analysis and forecasted subscribers for the circuit under analysis. The SF is based upon the number of subscribers using the particular circuit compared to a predetermined limit for the particular circuit also referred to as subscriber circuit capacity (subs/circuit sub limit). The historical subscriber forecast portion is based on data points of all of the actual subscribers using the circuit. For example in July, 2004, the subscriber circuit capacity for the particular circuit was 84.69% and in August, 2004, the subscriber circuit capacity was 87.18%. These subscriber circuit capacity data points are used to develop a linear plot, as described above, for the SF. In this example, the SF plot is based on the linear equation $y=0.0179x+0.8455$. The forecasted portion of the SF is determined by extending the linear plot forward from the base date. The SF may be determined by the tool 30 as a function of values inputted thereto or values collected from monitoring or other operations associated with the selected market area.

The analysis tool 30 generates a subscriber-based bandwidth capacity forecast, SBF to predict bandwidth capacity demands for the circuit as a function of subscribers on the circuit and average subscriber usage in the market area. The SBF is determined by the tool as a function of the subscriber trend S and MBT. Similar to the CBF, the forecasted trend F may be used to adjust the subscriber trend S according to the market. The subscriber-based capacity forecast SBF may be determined by the tool 30 as function of the subscriber trend S and market bandwidth trend MBT according to the following equation:

$$m_{SBF}=(m_{SF}+m_{MBT})/2$$

where $m_{SBF}$ is the slope of the subscriber-based bandwidth capacity forecast, $m_{SF}$ is the slope of the subscriber trend SF, and $m_{MBT}$ is the slope of the MBT.

The linear plot for the SBF is developed from the equation $y=m_{SBF}x+b$, wherein b vertical axis value at the end of the CBT linear plot. The linear plot for the SBF extends from the CBT. The SBF is a function of both the subscriber trend S and MBT This allows the SBF to take into consideration the average subscriber usage for the market area. The use of the SBF is advantageous because it allows the system operator to determine capacity requirements as a function of average usage across the entire market and not only the analyzed circuit.

This allows the chart 40 to provide a second means for predicting further circuit capacity needs. Like the predicted trend CBF, the SBF is affected by the subscriber bandwidth usage in the entire market (MBT) and therefore if the slope of the MBT is less than the slope of subscriber trend SF, the analysis will suggest that the date for action on the circuits can be put off by migrating subscribers to other circuits in the market. On the other hand, if the slope of MBT is greater than the slope of SF, the analysis will suggest that the circuit under analysis should be able to take some subscribers from other circuits in the market that may be overburdened.

In one embodiment, the tool 30 may be configured to determine whether the predicted trend CBF or SBF reaches the CBCT and which one reaches the CBCT first and to output an alert message regarding the same. The system operator may then determine a need for corrective action as a function of either one of the predicted P and SBF. This can be advantageous in that it allows the system operator to make decisions as a function of circuit utilization (CBF) and/or the number of future subscribers (SBF).

A corrective action bar 52 may included within the chart to reflect the date by which corrective action is required. The corrective action bar 52 is shown to correspond with the forecasted trend as the CBF has not be extend to cross the threshold. The corrective action bar and upgrade bar can be helpful in graphically illustrating whether the planned circuit upgrade will occur before predicted capacity requirements outpace the desired circuit capacity.

The foregoing example is provided for exemplary purposes and is not intended to limit the scope and contemplation of the present invention. In particular, the tool 30 may be configured to generate similar charts and alert message for any number of parameters associated with any number of the devices in the system, such as for assess processing capabilities, memory storage capabilities, and the like. Accordingly, the present invention provides a tool that may be used to automatically compare capacity versus predicted demand for any number of network devices and services.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   determining, by a computing device, a first bandwidth capacity forecast for a first network device;
   determining, by the computing device, a second bandwidth capacity forecast for a geographic area associated with the first network device;
   predicting, by the computing device, a device capacity demand based on the first bandwidth capacity forecast and the second bandwidth capacity forecast;
   comparing, by the computing device, the device capacity demand to a bandwidth capacity threshold and outputting a result of the comparing;
   determining, by the computing device, a first slope of the first bandwidth capacity forecast;
   determining, by the computing device, a second slope of the second bandwidth capacity forecast;
   based on determining that the first slope is greater than the second slope, determining, by the computing device, one or more users of the first network device to migrate to a second network device associated with the geographic area; and
   controlling migration of the one or more users of the first network device from the first network device to the second network device.

2. The method of claim 1, further comprising:
   receiving historical bandwidth consumption data for the geographic area;
   receiving average forecasted bandwidth demand data; and
   wherein determining the second bandwidth capacity forecast comprises determining the second bandwidth capacity forecast as a function of the historical bandwidth consumption data and the average forecasted bandwidth demand data.

3. The method of claim 1, further comprising: determining a capacity overload point as a function of the bandwidth capacity threshold and the predicted device capacity demand.

4. The method of claim 3, further comprising: determining one or more corrective actions for the first network device as a function of the capacity overload point and the predicted device capacity demand.

5. The method of claim 3, further comprising: calculating a period of time until the capacity overload point is surpassed by the predicted device capacity demand.

6. The method of claim 1, wherein the first network device is a network communications circuit.

7. The method of claim 1, wherein predicting the device capacity demand comprises determining an average slope of the first slope and the second slope.

8. The method of claim 7, further comprising: determining a planned upgrade of the first network device based on a comparison of the first slope and the second slope.

9. A method comprising:
   determining, by a computing device, a first bandwidth capacity forecast for a first network device;
   determining, by the computing device, a second bandwidth capacity forecast for a geographic area associated with the first network device;
   predicting, by the computing device, a device capacity demand based on the first bandwidth capacity forecast and the second bandwidth capacity forecast;
   comparing, by the computing device, the device capacity demand to a bandwidth capacity threshold and outputting a result of the comparing;
   determining, by the computing device, a first slope of the first bandwidth capacity forecast;
   determining, by the computing device, a second slope of the second bandwidth capacity forecast;
   after determining that the first slope is less than the second slope, determining, by the computing device, one or more users of a second network device associated with the geographic area to migrate to the first network device; and
   controlling migration of the one or more users of the second network device from the second network device to the first network device.

10. The method of claim 9 wherein the first network device is a network communications circuit.

11. A method comprising:
    determining, by a computing device, a first bandwidth capacity forecast for a network device;
    determining, by the computing device, a second bandwidth capacity forecast for a geographic area associated with the network device;
    predicting, by the computing device, a device capacity demand based on the first bandwidth capacity forecast and the second bandwidth capacity forecast;
    comparing, by the computing device, the device capacity demand to a bandwidth capacity threshold and outputting a result of the comparing;
    determining, by the computing device, a historical capacity demand of the network device;
    determining, by the computing device, a user capacity demand for the network device based on the historical capacity demand and the second bandwidth capacity forecast;

determining, by the computing device, whether the user capacity demand is expected to reach the bandwidth capacity threshold prior to the device capacity demand reaching the bandwidth capacity threshold;

after determining that the user capacity demand is expected to reach the bandwidth capacity threshold prior to the device capacity demand reaching the bandwidth capacity threshold, determining, by the computing device, a corrective action for the network device; and modifying the network device in accordance with the determined corrective action, wherein the corrective action comprises at least one of migration of one or more users from the network device or augmentation of the network device.

12. The method of claim 11, further comprising: determining a desired capacity threshold for the network device and determining a capacity overload point as a function of the desired capacity threshold and the device capacity demand.

13. The method of claim 12, wherein the corrective action is further determined based on the capacity overload point and the device capacity demand.

14. The method of claim 12, wherein the predicting the device capacity demand is further based on averaging a slope of the historical capacity demand with a slope of the user capacity demand.

* * * * *

UNITED STATES PATENT AND TRADEMARK OFFICE
CERTIFICATE OF CORRECTION

Page 1 of 1

PATENT NO.          : 10,108,905 B2
APPLICATION NO.     : 14/194014
DATED               : October 23, 2018
INVENTOR(S)         : Claude H. Bou-Abboud It is certified that error appears in the above-identified patent and that said Letters Patent is hereby corrected as shown below:

In the Specification

Column 2, Detailed Description of the Preferred Embodiment(s), Line 26:
After "(DVRs, PVRs)", please insert --,--

Column 4, Detailed Description of the Preferred Embodiment(s), Line 20:
Delete "mar." and insert --MBT.--

Signed and Sealed this
Nineteenth Day of February, 2019

Andrei Iancu
*Director of the United States Patent and Trademark Office*